(12) United States Patent
Farahani et al.

(10) Patent No.: US 12,241,684 B2
(45) Date of Patent: Mar. 4, 2025

(54) DIRECT REDUCTION SHAFT FURNACE WITH PROBE FOR MEASURING INTERIOR GAS ANALYSIS

(71) Applicant: ArcelorMittal, Luxembourg (LU)

(72) Inventors: Mahdi Farahani, Munster, IN (US); Justin Farley, Sorel-Tracy (CA); George Tsvik, Valparaiso, IN (US); Gabriel Jesus Lucena Mogollon, Saint-Hubert (CA)

(73) Assignee: ArcelorMittal, Luxembourg (LU)

( * ) Notice: Subject to any disclaimer, the term of this patent is extended or adjusted under 35 U.S.C. 154(b) by 768 days.

(21) Appl. No.: 17/292,512

(22) PCT Filed: Nov. 13, 2018

(86) PCT No.: PCT/IB2018/058888
§ 371 (c)(1),
(2) Date: May 10, 2021

(87) PCT Pub. No.: WO2020/099908
PCT Pub. Date: May 22, 2020

(65) Prior Publication Data
US 2021/0396469 A1 Dec. 23, 2021

(51) Int. Cl.
*F27B 1/28* (2006.01)
*C21B 13/02* (2006.01)
(Continued)

(52) U.S. Cl.
CPC ............... *F27B 1/28* (2013.01); *C21B 13/02* (2013.01); *F27D 21/0014* (2013.01);
(Continued)

(58) Field of Classification Search
CPC .............. F27B 1/28; F27B 1/26; C21B 13/02; C21B 7/24; F27D 21/0014; F27D 2021/0007;
(Continued)

(56) References Cited

U.S. PATENT DOCUMENTS 2,670,946 A * 3/1954 Royster ..................... F27B 1/08
422/639
3,085,435 A * 4/1963 Miscoe ..................... C21B 7/24
73/863.81
(Continued)

FOREIGN PATENT DOCUMENTS

CN 205333114 U 6/2016
CN 107883112 A * 4/2018 ............ F16L 55/162
(Continued)

OTHER PUBLICATIONS

Takada, Tsukasa, et al. "Investigation of degradation of sinter in blast furnace with a new vertical probe." Transactions of the Iron and Steel Institute of Japan 26.8 (1986): 710-716. (Year: 1986).*
See Search Report of PCT/IB2018/058888 dated Mar. 6, 2019.

*Primary Examiner* — Keith D. Hendricks
*Assistant Examiner* — Moriah S. Smoot
(74) *Attorney, Agent, or Firm* — Davidson Kappel LLC

(57) ABSTRACT

A direct reduction shaft furnace having at least one probe disposed vertically within the reduction zone thereof. The probe preferably extends from the top to the bottom of the reduction zone. The probe allows for gas sampling along the length thereof and transmittal of the gas to at least one type of gas analysis device. The probe may also allow for the measurement of the temperature and pressure of the gas sample as it is taken.

12 Claims, 6 Drawing Sheets

(51) Int. Cl.
*F27D 21/00* (2006.01)
*G01K 13/024* (2021.01)
*H01J 49/04* (2006.01)

(52) U.S. Cl.
CPC ........ *G01K 13/024* (2021.01); *H01J 49/0422* (2013.01); *F27D 2021/0007* (2013.01)

(58) Field of Classification Search
CPC ....... F27D 19/00; F27D 21/00; G01K 13/024; H01J 49/0422; Y02P 10/143
See application file for complete search history.

(56) References Cited

U.S. PATENT DOCUMENTS

| | | |
|---|---|---|
| 3,240,069 A | 3/1966 | Kennedy |
| 3,369,888 A * | 2/1968 | Cruse, Jr. ............ C21B 13/0046 75/378 |
| 3,601,381 A * | 8/1971 | Beggs .................... C21B 13/02 266/85 |
| 3,888,123 A | 6/1975 | Kuntziger |
| 4,044,612 A | 8/1977 | Powell et al. |
| 4,248,623 A | 2/1981 | Papst et al. |
| 5,108,192 A | 4/1992 | Mailliet et al. |
| 2016/0054215 A1* | 2/2016 | Williamson ......... G08B 17/117 73/28.01 |

FOREIGN PATENT DOCUMENTS

| | | | | |
|---|---|---|---|---|
| CN | 109555970 B | * | 5/2020 | ............. F17D 1/082 |
| JP | S5129990 A | | 3/1976 | |
| JP | S54163710 A | | 12/1979 | |
| JP | S5822954 U | | 2/1983 | |
| JP | S6077908 A | | 5/1985 | |
| JP | S-6290525 A | * | 4/1987 | |
| JP | S6452011 A | | 2/1989 | |
| JP | H04106346 U | | 9/1992 | |
| JP | H04106347 U | | 9/1992 | |
| JP | H0554996 U | | 7/1993 | |
| JP | 2007246947 | | 9/2007 | |
| JP | 2007246947 A | * | 9/2007 | |
| JP | 2009294174 A | | 12/2009 | |
| KR | 940003648 Y1 | | 6/1994 | |
| KR | 20120012252 A | | 2/2012 | |

* cited by examiner

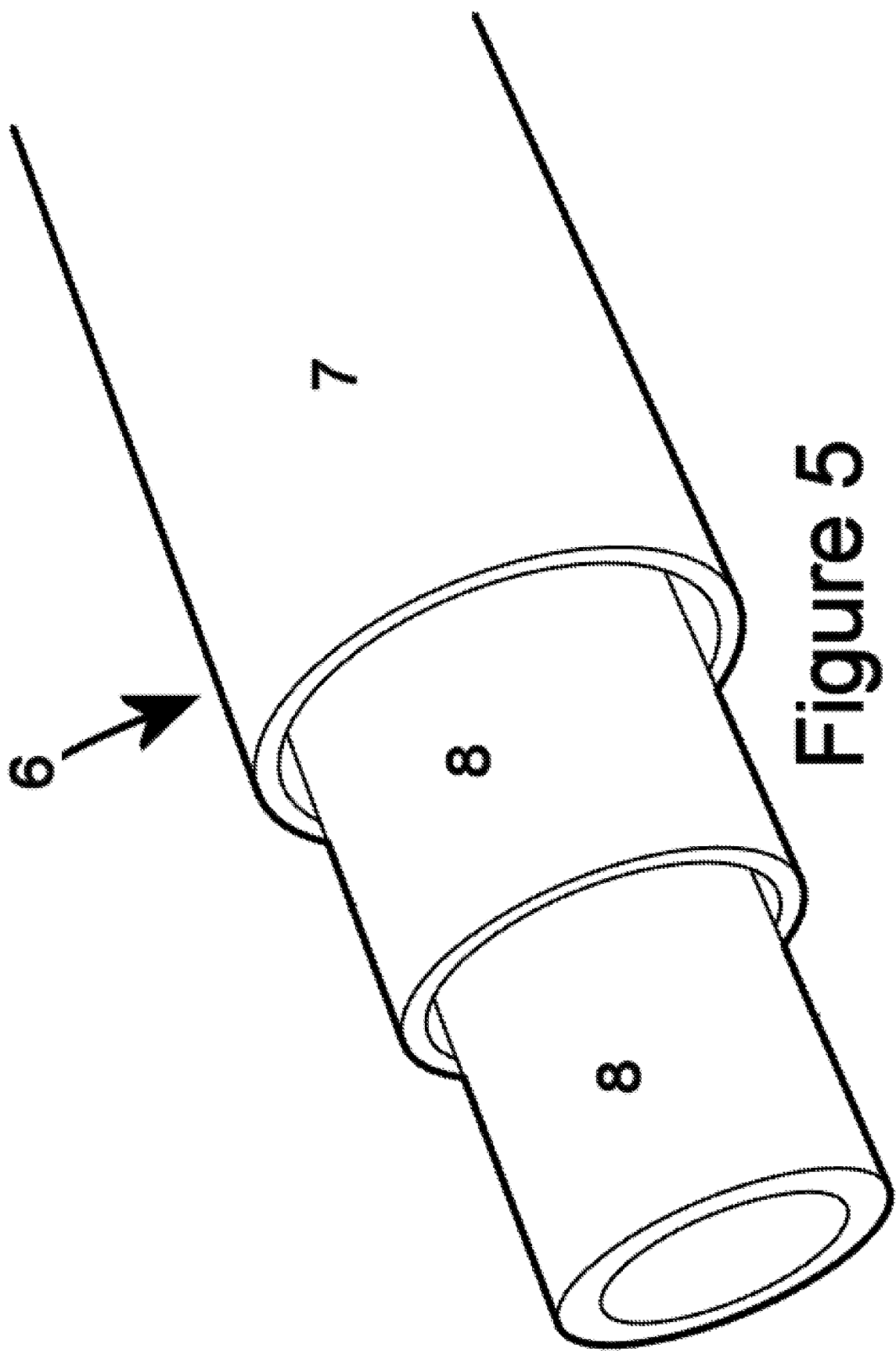

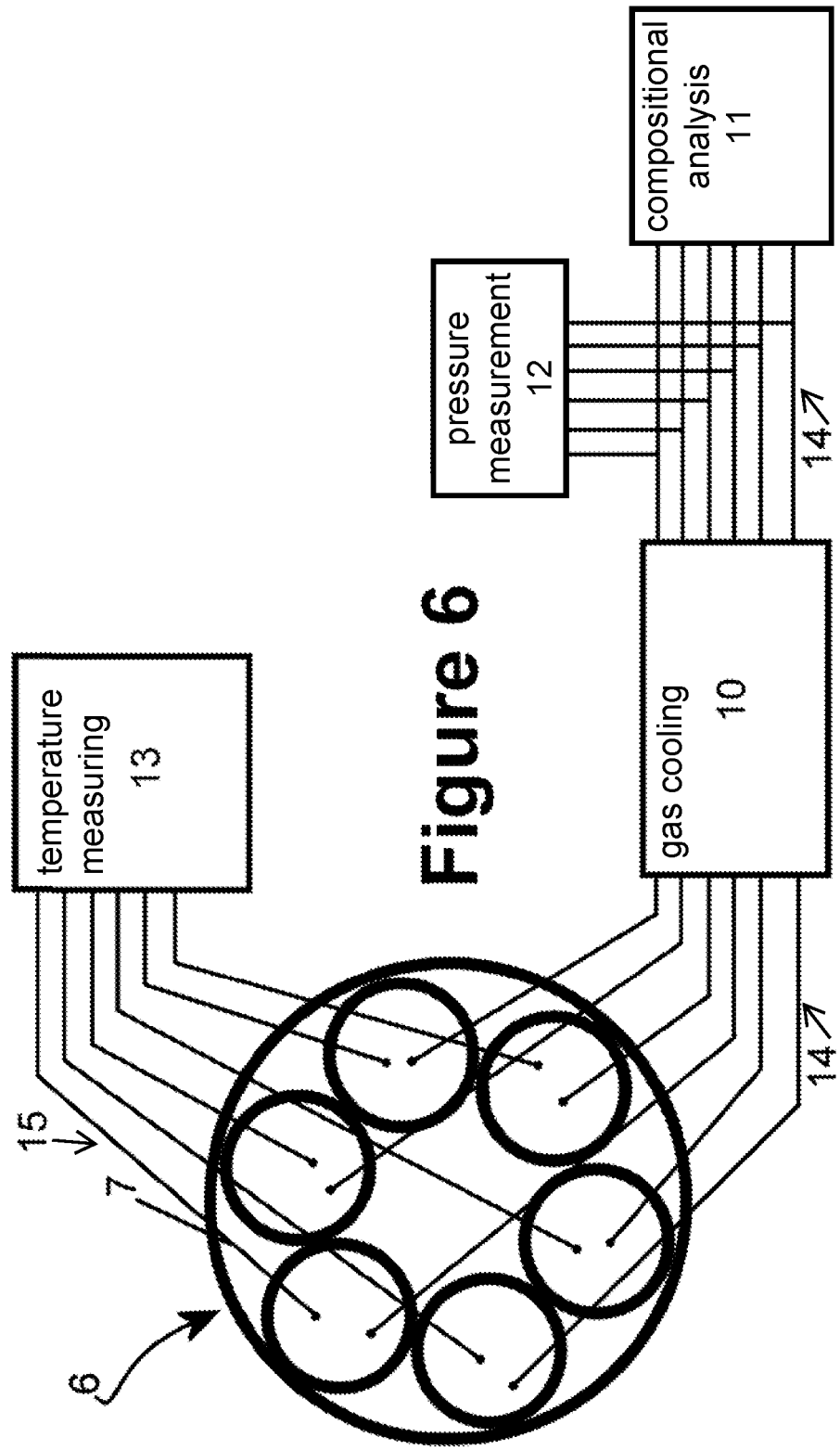

DIRECT REDUCTION SHAFT FURNACE WITH PROBE FOR MEASURING INTERIOR GAS ANALYSIS

FIELD OF THE INVENTION

The present invention relates generally to any type of shaft furnaces, including direct reduction shaft furnaces. More specifically the present invention relates to internal sensors for direct reduction shaft furnaces. In particular, the present invention relates to direct reduction shaft furnaces having at least one probe to measure temperature and collect gas samples at different levels within the reduction zone thereof.

BACKGROUND

A direct reduction process for producing high quality metallized pellets has an extremely high degree of thermal efficiency. Direct reduced iron (DRI) is produced from the direct reduction of iron ore (in the form of lumps, pellets, or fines) to iron by a reducing gas. Hematite/Magnetite ores are suitable for direct reduction.

Reduced iron derives its name from the chemical change that iron ore undergoes when it is heated in a furnace at high temperatures in the presence of hydrocarbon-rich gases, carbon monoxide, hydrogen, or elemental carbon. Direct reduction refers to processes which reduce iron oxides to metallic iron at temperatures below the melting point of iron. The product of such solid-state processes is called direct reduced iron.

The process employs a vertical shaft type furnace 1, a depiction of which is shown in FIG. 1. The shaft furnace 1 has a reducing zone 2 in the upper region of the furnace and a cooling zone 3 in the lower region of the furnace. Hot reducing gas from any external source is introduced to the reducing zone 2 via gas inlet 4. For the purpose of overall process description, the reducing gas utilized herein consists principally of CO and $H_2$ generally produced by either the continuous catalytic reforming of a hydrocarbon such as natural gas, petroleum distillates, methane, ethane, propane, butane, or other readily vaporizable hydrocarbon, or syngas from any source such as coal gasifier. The objective of the reduction process is to drive off the oxygen contained in various forms of iron ore (sized ore, concentrates, pellets, mill scale, furnace dust, etc.), in order to convert the ore to metallic iron, without melting it. The reduction process temperature is typically 800 to 1200° C.

A metallized product, which is at least 85 percent reduced and preferably at least 90 percent reduced is produced. A gravitational flow of metal oxide material or burden is established by charging particulate metal oxide material to the upper portion of the furnace and removing the metallized product from the bottom of the furnace. The hot reducing gas having CO and $H_2$ as reductant components is introduced to the flow of material through a bustle pipe and tuyere inlet system intermediate the ends of the furnace. The gases flow countercurrent upward through the material, reducing a substantial portion of the metal oxide, and forms a top gas. The top gas is removed from the upper portion of the furnace through gas outlet 5.

The descending burden in a direct reduction (DR) shaft furnace faces different gas composition and temperature at each level of furnace. The overall reactions in the DR furnace are:

Overall Reactions $$Fe_2O_3 + 3H_2 \Rightarrow 2Fe + 3H_2O$$

$$Fe_2O_3 + 3CO \Rightarrow 2Fe + 3CO_2$$

However, there are a large number of intermediate reactions to get the final overall reactions. These intermediate reactions include:

| Reaction | Heat Required | Reaction Descriptor |
|---|---|---|
| $3Fe_2O_3 + CO \rightarrow 2Fe_3O_4 + CO_2$ | Exothermic | Reduction by CO |
| $3Fe_2O_3 + H_2 \rightarrow 2Fe_3O_4 + H_2O$ | Exothermic | Reduction by $H_2$ |
| $Fe_3O_4 + CO \rightarrow 3FeO + CO_2$ | Endothermic | Reduction by CO |
| $Fe_3O_4 + H_2 \rightarrow 3FeO + H_2O$ | Endothermic | Reduction by $H_2$ |
| $FeO + CO \rightarrow Fe + CO_2$ | Exothermic | Reduction by CO |
| $FeO + H_2 \rightarrow Fe + H_2O$ | Endothermic | Reduction by $H_2$ |
| $3Fe + CH_4 \rightarrow Fe_3C + 2H_2$ | Endothermic | Carburizing Reaction |
| $3Fe + 2CO \rightarrow Fe_3C + CO_2$ | Exothermic | Carburizing Reaction |
| $3Fe + CO + H_2 \rightarrow Fe_3C + H_2O$ | Exothermic | Carburizing Reaction |

At the present time, there is no way to determine what reactions are occurring at any level within the reduction zone at any given time. Thus, because there is currently no in-situ measurement of gas analysis inside the shaft furnace, the artisan can only model the DR reduction zone based on the input and output (gaseous and solid) thereof. Measuring gas composition, temperature, and pressure inside the furnace could provide useful information such as reducing potential at different levels, reduction kinetics, evolution of chemical reactions along the shaft furnace, pressure drop, carburization phenomena, in-situ reforming, as well as temperature profile. Thus, there is a need in the art for direct reduction shaft furnaces that include a thermo-gas probe in reduction zone thereof.

SUMMARY OF THE INVENTION

The present invention is an apparatus for the direct reduction of oxide ore. The apparatus includes a vertical shaft furnace having a oxide ore reducing zone and at least one probe for sampling gas from within the reduction zone of the vertical shaft furnace. The probe may be disposed vertically within said reduction zone and extend through the entire reduction zone. The probe may include a plurality of sampling pipes. Each sampling pipe may have an upper portion and an end portion. The sampling pipes may be disposed within at least one support pipe. The support pipe may encase and support a portion of the upper portion of all of the sampling pipes.

The end portion of each of the sampling pipes may be configured to allow for intake of a gas sample therethrough. The end portion of each of the sampling pipes may further include a thermocouple disposed therein to measure the temperature of the gas sample. Each of the sampling pipes are of different length and extend down through the reduction zone different distances so as to allow for intake of samples from different depths in the reduction zone.

Each of the sampling pipes may be the same length as the rest of the sampling pipes. Each of the sampling pipes may have a gas intake port disposed through the wall thereof. Each gas intake port is disposed at a different position along the length the sampling tube than the ports on the rest of the sampling pipes. Each gas intake port may be configured to allow for intake of a gas sample therethrough. The end portion of each sampling pipe may be closed off to prevent gas from entering therethrough. Each sampling pipe may further include a thermocouple disposed adjacent the gas intake port to measure the temperature of the gas sample.

A first of sampling pipe may be concentrically nested within the support pipe. The first sampling pipe may be longer than the support tube and may have an end portion protruding from the support pipe. Each subsequent sampling pipe may be concentrically nested within the previous sampling pipe and may be is longer than the previous sampling pipe so as to have an end portion that protrudes from the previous sampling pipe. The end portion of each of sampling tube may be configured to allow for intake of a gas sample therethrough. The end portion of each sampling pipe may further include a thermocouple disposed therein to measure the temperature of the gas sample.

The apparatus for the direct reduction of oxide ore may further include a gas analysis system and pressure measurement system which may include a gas cooling system to cool the gas sample before compositional analysis and pressure measurement. The gas analysis system may further include a gas analysis device, which may be a mass spectrometer or laser/infrared analyzer.

BRIEF DESCRIPTION OF THE DRAWINGS

FIG. 5 is a 3D perspective view of a telescoping embodiment of a probe 6 for use in the present invention;

FIG. 6 shows a schematic depiction of a probe 6 which is disposed vertically within the reduction zone and connected to a temperature measurement system, and a gas analysis system.

DETAILED DESCRIPTION OF THE INVENTION

The present invention relates to a DR shaft furnace having at least one probe disposed vertically within the reduction zone thereof. The probe preferably extends from the top to the bottom of the reduction zone. The probe allows for gas sampling along the length thereof and transmittal of the gas to at least one type of gas analysis device and to a pressure measurement instrument. The probe may also allow for the measurement of the temperature of the gas sample as it is taken. Thus, the inventive combination of the DR furnace and the probe allows for the taking of gas samples and temperatures at different levels inside of the furnace. The probe can be installed vertically at one or more locations along the diameter of DR shaft furnace.

Figure 1:
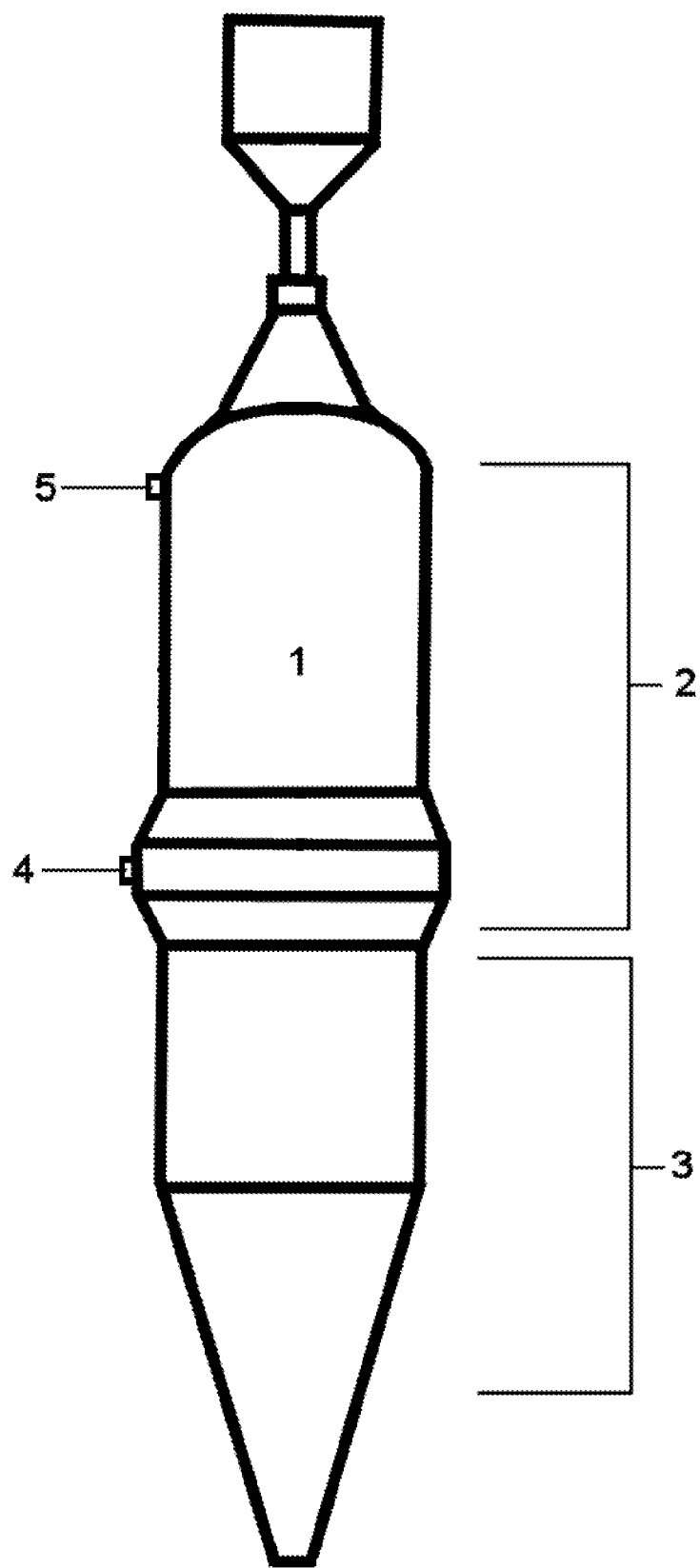
FIG. 1 is a schematic depiction of a vertical shaft type furnace into which the present gas analysis probe may be installed.
Figure 2:
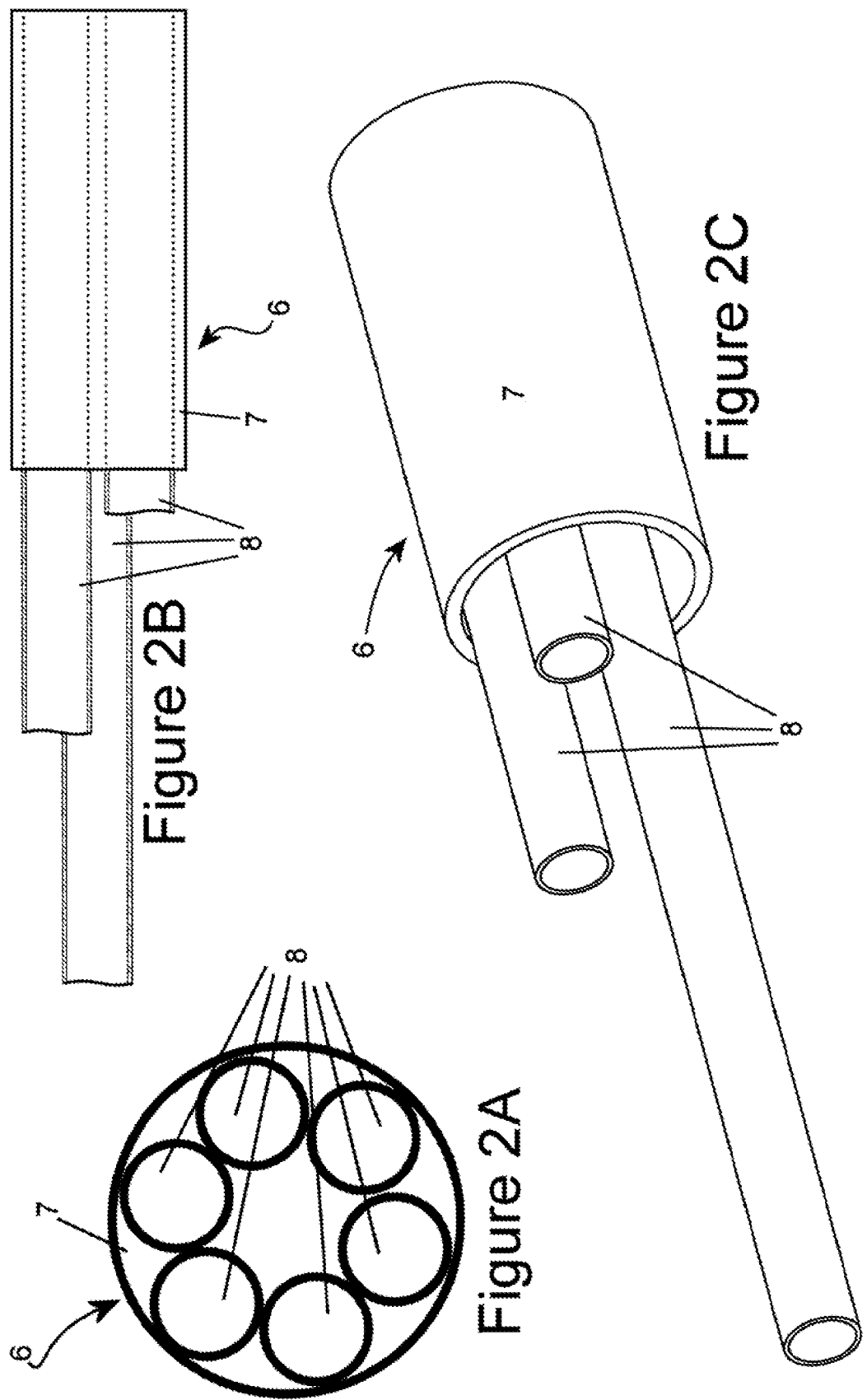
FIG. 2A is a cross section across the diameter of a first embodiment of the probe 6 used in the present invention.
FIG. 2B is a side view of the first embodiment of the probe 6.
FIG. 2C is a 3D perspective view of the first embodiment of the probe 6.

Different depictions of a first embodiment of the probe 6 used in the present invention is shown in FIGS. 2A-2C. This embodiment has separate gas sampling pipes 8 that have different lengths and a supporting pipe 7. In this embodiment, all of the gas sampling pipes 8 are longer than the support pipe 7. Gas samples are drawn into the sampling pipe through the open end thereof. A thermocouple (shown schematically in FIG. 6) may be stationed at the open end of each sampling pipe 8. This allows for a temperature profile measurement of the reduction zone of the DR furnace and indicates the temperature of the gas as taken for analysis. In this embodiment, all of the sampling pipes 8 are all of different lengths in order to take gas samples all along the reduction zone. FIG. 2A is a cross section across the diameter of the first embodiment of the probe 6. FIG. 2B is a side view of the first embodiment of the probe 6. Finally, FIG. 2C is a 3D perspective view of the first embodiment of the probe 6.

Figure 3:
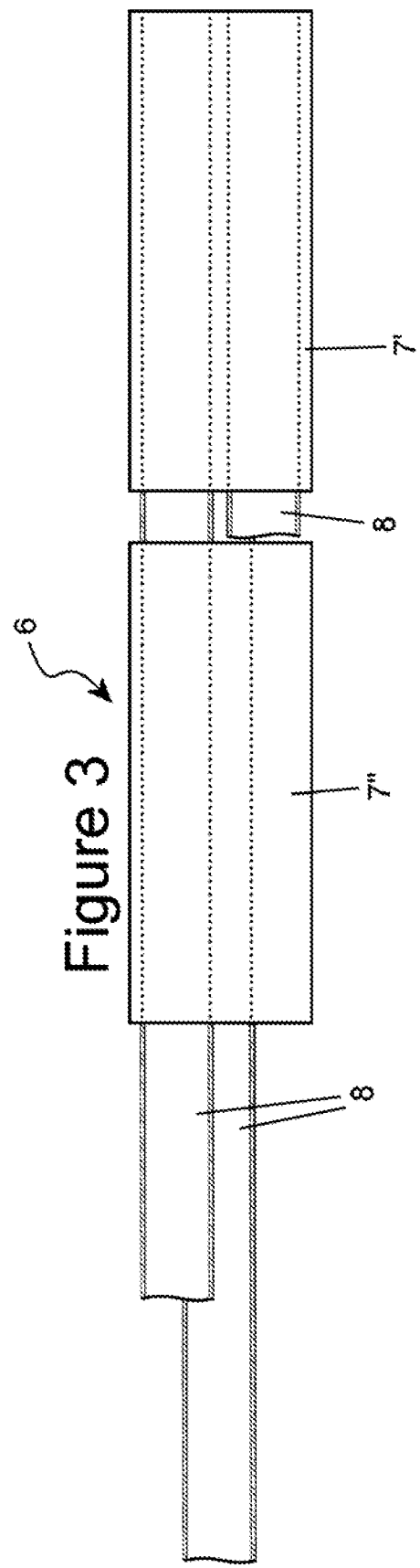
FIG. 3 is a side view of A second embodiment of the probe 6.

In another embodiment there may be multiple support tubes 7. FIG. 3 is a side view of this second embodiment of the probe 6. Two or more support pipes 7 may hold the sampling pipes 8. There may be gaps between support tubes 7' and 7" and a sampling tube 8 may terminate in this gap to take samples at this level in the reduction zone. Again, thermocouples (shown schematically in FIG. 6) may be stationed at the open end of each sampling pipe 8.

Figure 4:
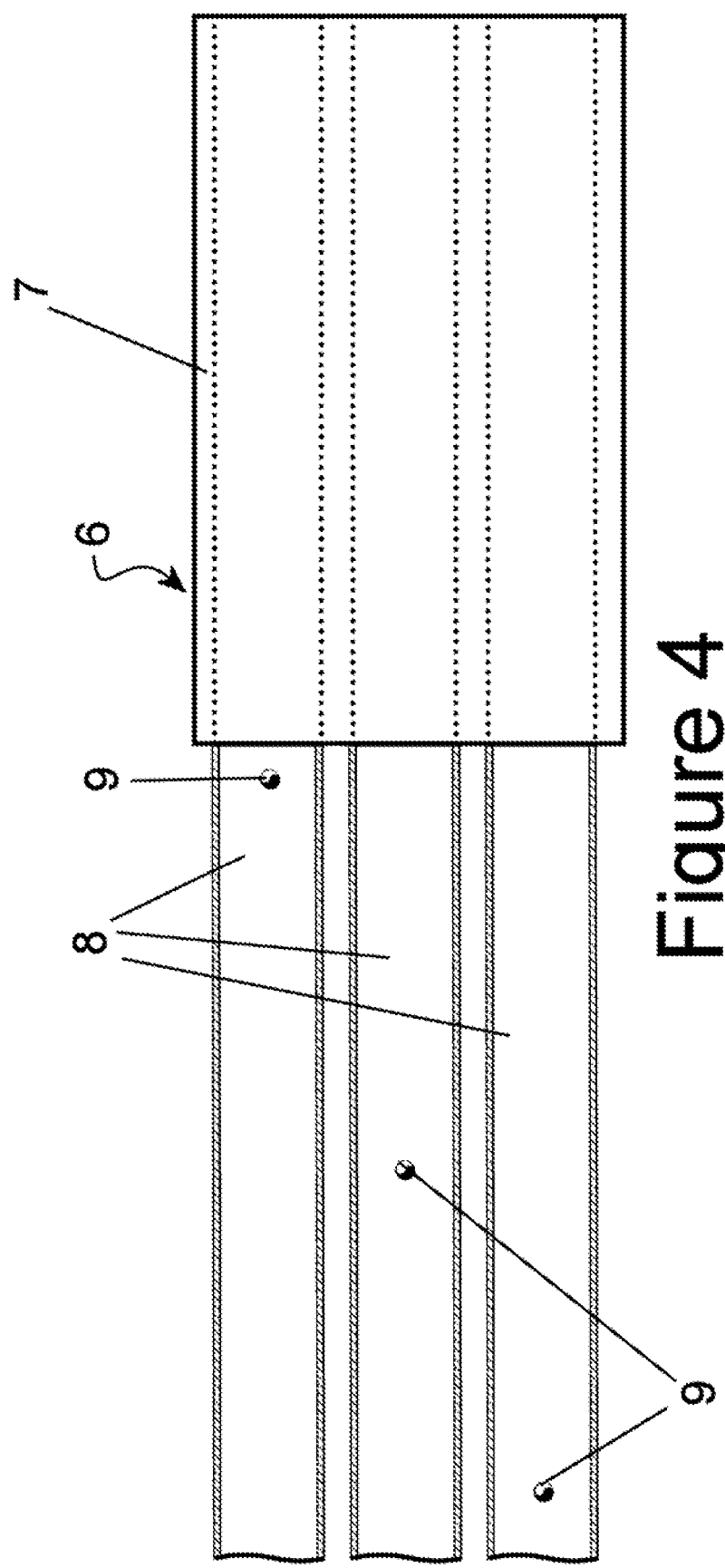
FIG. 4 depicts a side view of another embodiment of a probe 6 for use in the present invention.

FIG. 4 depicts yet another embodiment of a probe 6 for use in the present invention. In this embodiment, there is a single support pipe 7 and all of the sampling pipes 8 are about the same length. Each sampling pipe 8 has a sampling port 9 at a different location thereon so as to allow for gas samples to be taken along the entire reduction zone. As discussed above, thermocouples (shown schematically in FIG. 6) may be installed in each sampling pipe 8 adjacent to the sampling port 9.

FIG. 5 depicts a telescoping embodiment of a probe 6 for use in the present invention. In this embodiment, the sampling pipes 8 are concentrically nested in a telescoping fashion within the support pipe 7. Thus, a first sampling pipe 8 is concentrically nested within the support pipe 7. The first sampling pipe 8 being longer than and protruding from the support pipe 7. Next another sampling pipe 8 is concentrically nested within the first sampling pipe. This concentric nesting is continued with additional sampling pipes 8 to provide as many gas sampling pipes 8 as is necessary or desired to sample the entire reduction zone. Each additional sampling pipe 8 being longer than and protruding from the previous sampling port in which it is nested. As the other embodiments, thermocouples (shown schematically in FIG. 6) may be installed at the terminal (gas sampling) end of each sampling pipe 8.

The support pipes 7 and sampling ports 8 are formed of material selected to be suitable at the high temperature condition and corrosive atmosphere of the DR furnace.

In general, the probe 6 is designed to take gas samples at different levels inside of the DR furnace reduction zone, as well as (optionally) measuring the temperature. Gas samples will be used for gas analysis, and pressure measurement. The probe 6 may be installed vertically in up to 5 different locations along the diameter of DR shaft furnace reduction zone.

FIG. 6 shows a schematic depiction of a shaft furnace probe 6 with a schematic depiction of a temperature measurement system, and a gas analysis system attached thereto. The gas analysis system includes gas transmission lines 14, a gas cooling apparatus 10 which cools the gas samples. The gas samples are then directed to both a gas compositional analyzing system 11, and a gas pressure measuring system 12. The temperature measuring system 13 includes thermocouples/transmission lines 15.

The sample analysis system 11 may include a mass spectrometer or laser/infrared analyzer.

The probe 6 may be fixed to the furnace roof. The fixation may be accomplished by, for example, employing a welded flange at the top of the probe 6. The pipes (support 7 and sampling 8) may be welded together along their length to give higher mechanical strength and resistance to bending and fracture.

What is claimed is:

1. An apparatus for the direct reduction of metal ore, the apparatus comprising:
    a vertical shaft furnace for the direct reduction of metal ore, the vertical shaft furnace having a metal ore reduction zone in an upper region of the vertical shaft furnace and a cooling zone in a lower region of the vertical shaft furnace;
    at least one probe for sampling gas from within the reduction zone of said vertical shaft furnace;
    the at least one probe being disposed vertically within the reduction zone and extending through the entire reduction zone;
    the probe comprising a plurality of sampling pipes, each sampling pipe having an upper portion and an end portion, the sampling pipes being disposed within at least one support pipe;
    wherein the plurality of sampling pipes are concentrically nested, wherein a first sampling pipe of the plurality of sampling pipes has a first length and each subsequent one of the plurality of sampling pipes being concentrically nested within a previous one of the sampling pipes and being longer than the previous sampling pipe so as to have an end portion protruding from the previous sampling pipe.

2. The apparatus as recited in claim 1 wherein the support pipe encases and supports a portion of the upper portion of all of the sampling pipes.

3. The apparatus as recited in claim 2 wherein the end portion of each of the sampling pipes is configured to allow for intake of a gas sample therethrough.

4. The apparatus as recited in claim 3 wherein the end portion of each of the sampling pipes further includes a thermocouple to measure a temperature of the gas sample.

5. An apparatus for the direct reduction of metal ore, the apparatus comprising:
    a vertical shaft furnace for the direct reduction of metal ore, the vertical shaft furnace having a metal ore reduction zone in an upper region of the vertical shaft furnace and a cooling zone in a lower region of the vertical shaft furnace;
    at least one probe for sampling gas from within the reduction zone of said vertical shaft furnace;
    the at least one probe being disposed vertically within the reduction zone and extending through the entire reduction zone;
    the probe comprising a plurality of sampling pipes, each sampling pipe having an upper portion and an end portion, the sampling pipes being disposed within at least one support pipe; wherein:
    a first of the sampling pipes is concentrically nested within the support pipe, the first sampling pipe being longer than and having an end portion protruding from the support pipe;
    each subsequent one of the sampling pipes being concentrically nested within a previous of the sampling pipes and being longer than the previous sampling pipe so as to have an end portion protruding from the previous sampling pipe.

6. The apparatus as recited in claim 5 wherein the end portion of each of said sampling tubes is configured to allow for intake of a gas sample therethrough.

7. The apparatus as recited in claim 6 wherein the end portion of each of the sampling pipes includes a thermocouple disposed therein to measure a temperature of the gas sample.

8. The apparatus as recited in claim 7 further comprising a gas analysis system.

9. The apparatus as recited in claim 8 wherein the gas analysis system includes a gas cooling system to cool the gas sample before compositional analysis.

10. The apparatus as recited in claim 9 wherein the gas analysis system further includes a gas compositional analyzer.

11. The apparatus as recited in claim 10 wherein said gas compositional analyzer includes a mass spectrometer.

12. The apparatus as recited in claim 10 wherein the gas analysis system further includes a gas pressure measurement system.

* * * * *